(12) United States Patent
Chumerin

(10) Patent No.: US 12,536,672 B2
(45) Date of Patent: Jan. 27, 2026

(54) DEVICE AND A METHOD FOR REPRESENTING THE YAW ORIENTATION OF A VEHICLE VISIBLE ON AN IMAGE

(71) Applicant: TOYOTA MOTOR EUROPE, Brussels (BE)

(72) Inventor: Nikolay Chumerin, Brussels (BE)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 321 days.

(21) Appl. No.: 18/039,807

(22) PCT Filed: Dec. 3, 2020

(86) PCT No.: PCT/EP2020/084554
§ 371 (c)(1),
(2) Date: Jun. 1, 2023

(87) PCT Pub. No.: WO2022/117199
PCT Pub. Date: Jun. 9, 2022

(65) Prior Publication Data
US 2024/0005525 A1 Jan. 4, 2024

(51) Int. Cl.
*G06T 7/246* (2017.01)
*G06T 7/73* (2017.01)

(52) U.S. Cl.
CPC .............. *G06T 7/248* (2017.01); *G06T 7/74* (2017.01); *G06T 2207/10016* (2013.01); *G06T 2207/30252* (2013.01)

(58) Field of Classification Search
CPC . G06T 7/248; G06T 7/74; G06T 2207/10016; G06T 2207/30252
See application file for complete search history.

(56) References Cited

U.S. PATENT DOCUMENTS 12,049,170 B2 * 7/2024 He .................. B60R 1/025
2019/0335100 A1 * 10/2019 Chen ................. B60R 1/26
2020/0238991 A1 7/2020 Aragon et al.

FOREIGN PATENT DOCUMENTS

CN 111081033 A * 4/2020 .......... G08G 1/056
DE 102019002269 A1 * 2/2020 .......... G01C 11/04

OTHER PUBLICATIONS

Mahendran et al.; "Monocular Object Orientation Estimation using Riemannian Regression and Classification Networks;" arXiv; 2018; pp. 1-24.

(Continued)

*Primary Examiner* — Pinalben Patel
(74) *Attorney, Agent, or Firm* — Oliff PLC

(57) ABSTRACT

A device and a method for representing the yaw orientation of a vehicle visible on an image, including: obtaining the position in the image of a rectangular bounding box surrounding the vehicle, obtaining the position of a vertical split line of the bounding box configured to be placed at a corner of the vehicle separating a first portion of the vehicle from a second portion of the vehicle, the first and second portion being either the front, the back, or a side of the vehicle, determining a signed horizontal shift of a horizontal position, associated with the vertical split line, with respect to a horizontal reference position, associated to the bounding box, normalizing the signed horizontal shift to obtain a value θ to be used in the representation of the pose of the vehicle.

11 Claims, 2 Drawing Sheets

(56) References Cited

OTHER PUBLICATIONS

Kendall et al.; "PoseNet: a Convolutional Network for Real-Time 6-DOF Camera Relocalization;" Proceedings of the IEEE International Conference on Computer Vision; 2015; pp. 1-9.

Kendall et al.; "Modelling Uncertainty in Deep Learning for Camera Relocalization;" 2016 IEEE International Conference on Robotics and Automation (ICRA); IEEE; 2016; pp. 1-8.

Kendall et al.; "Geometric loss functions for camera pose regression with deep learning;" Proceedings of the IEEE Conference on Computer Vision and Pattern Recognition; 2017; pp. 1-10.

Mousavian et al.; "3D Bounding Box Estimation Using Deep Learning and Geometry;" Proceedings of the IEEE Conference on Computer Vision and Pattern Recognition; 2017; pp. 7074-7082.

Li et al.; "A Unified Framework for Multi-View Multi-Class Object Pose Estimation;" Proceedings of the European Conference on Computer Vision (ECCV); 2018; pp. 1-17.

Güler et al.; "DenseReg: Fully Convolutional Dense Shape Regression In-the-Wild;" Proceedings of the IEEE Conference on Computer Vision and Pattern Recognition; 2017; pp. 1-11.

Geiger et al.; Vision meets Robotics: The KITTI Dataset; The International Journal of Robotics Research 32.11 (2013); pp. 1231-1237.

L. Novak; "Vehicle detection and pose estimation for autonomous driving;" Diss. Master's thesis, Czech Technical University in Prague, 2017.

Huang et al.; "DenseBox: Unifying Landmark Localization with End to End Object Detection;" arXiv; 2015; pp. 1-13.

Xu et al.; "PointFusion: Deep Sensor Fusion for 3D Bounding Box Estimation;" Proceedings of the IEEE Conference on Computer Vision and Pattern Recognition; 2018; pp. 244-253.

Li et al.; "Vehicle Detection from 3D Lidar Using Fully Convolutional Network;" arXiv; 2016; pp. 1-8.

Chen et al.; "Multi-View 3D Object Detection Network for Autonomous Driving;" IEEE CVPR; 2017; pp. 1-9.

Aug. 18, 2021 Search Report issued in International Patent Application No. PCT/EP2020/084554.

* cited by examiner

DEVICE AND A METHOD FOR REPRESENTING THE YAW ORIENTATION OF A VEHICLE VISIBLE ON AN IMAGE

FIELD OF THE DISCLOSURE

The present disclosure is related to the field of image processing, and more precisely to the detection of vehicles visible on images.

DESCRIPTION OF RELATED ART

The detection of vehicles on images acquired by cameras mounted in vehicles has become a critical issue for improving partially autonomous or autonomous methods for controlling vehicles such as cars. Detection of vehicle is often completed by tracking of the vehicles which have been detected on a plurality of consecutive image frames acquired by these cameras.

The need for reliable techniques for detecting and tracking vehicles has now become critical.

Also, in the recent years, the use of machine learning techniques (i.e., deep neural networks) has facilitated the detection and the tracking of objects.

In order to detect and track vehicles, it is necessary to use representations of the position and orientation of these vehicles, the position and the orientation forming what is called the pose of these vehicles. These representations include a set of values such as coordinates, angles, etc. For example, a representation can be a computer representation, which can be used in a computer program to represent the position and the orientation of a real-world vehicle.

It is usually desired to use representations with a limited number of variables so as to limit the computing load.

In computer vision, the representation of an object in a 3D space is often done using 3D bounding boxes (3DBB), which are convenient representations of the 3D bounding volume containing the object of interest. Generally, 3DBB have nine degrees of freedom (DOF): three for dimensions/extents (width, height and depth), and three coordinates (X, Y, Z) for position, and three angles for orientation.

In the case of automotive applications, the objects of interest (vehicles for example) are presumably located on the ground plane, and therefore their roll and pitch angles with respect to the ground plane can be considered to be zero, which reduces the number of DOF by two. Moreover, the bottom face of the vehicle 3D bounding box can be considered to belong to the ground plane, which allows disregarding another DOF. Therefore, for a 3DBB and in the context of vehicle detection, it is useful to only consider six DOF.

Document "Monocular Object Orientation Estimation using Riemannian Regression and Classification Networks." (Mahendran S., et al. arXiv preprint arXiv:1807.07226 (2018)) discloses using only 6DOF for a 3DBB.

Also, the 3D orientation can be represented in several different ways:
- by Euler angles (azimuth, elevation and camera tilt, or yaw, pitch, and roll);
- by axis-angles;
- by quaternions (4-dimensional representation with an additional unit-norm constraint, but avoids the unpleasant transition between 0° and 360°), as disclosed for example in documents "Posenet: A convolutional network for real-time 6-dof camera relocalization." (Kendall A., Grimes M., Cipolla R. Proceedings of the IEEE international conference on computer vision. 2015), "Modelling uncertainty in deep learning for camera relocalization." (Kendall A., Cipolla R. 2016 IEEE international conference on Robotics and Automation (ICRA). IEEE, 2016.), or "Geometric loss functions for camera pose regression with deep learning." (Kendall A., Cipolla R. Proceedings of the IEEE Conference on Computer Vision and Pattern Recognition. 2017.)

Typically, the orientation of a vehicle is usually defined using only the yaw angle, as described in documents "Monocular Object Orientation Estimation using Riemannian Regression and Classification Networks." mentioned above, "3d bounding box estimation using deep learning and geometry." (Mousavian A., et al. Proceedings of the IEEE Conference on Computer Vision and Pattern Recognition. 2017, (pp. 7074-7082).), "A unified framework for multi-view multi-class object pose estimation." (Li Ch., Bai J., Hager G. D. Proceedings of the European Conference on Computer Vision (ECCV). 2018), "Densereg: Fully convolutional dense shape regression in-the-wild." (Alp Guler R., et al. Proceedings of the IEEE Conference on Computer Vision and Pattern Recognition. 2017.), and "Vision meets robotics: The KITTI dataset." (Geiger A., et al. The International Journal of Robotics Research 32.11 (2013): 1231-1237.).

It has also been proposed to use as representation the projection of a 3DBB from the 3D space to a 2D space. These projections are often called 2.5D bounding boxes, or 2.5DBB.

For example, in section 3.3 of document "Vehicle detection and pose estimation for autonomous driving" (Novak L. Diss. Master's thesis, Czech Technical University in Prague, 2017. Cited on, 2017.), 2.5DBB are represented by seven numbers: three borders of the "car bottom" (X, Y for front left, front right, rear left).

In document "Densebox: Unifying landmark localization with end to end object detection." (Lichao H., et al. arXiv preprint arXiv: 1509.04874 (2015).), 2.5DBB are used with eight landmarks (specific portions) for a car.

Another 2.5DBB method has been disclosed in document "Multi-view 3d object detection network for autonomous driving" (Chen X., et al. In IEEE CVPR, 2017.) This solution proposes using a split line to separate a single rectangle (or bounding box) in two between the visible front/rear portion of the vehicle and the visible side. Binary values are used to indicate which side of the split line is a side of the vehicle or the front/back, this solution has been observed by the inventors as unsatisfactory as it induces instability in the tracking. In fact, using binary values may lead the split line to jumping from one side to the other in scenes where the vehicle is seen from substantially one side (for example from the back and when the sides are barely visible), as is typically the case in a standard driving situation.

The above solutions do not provide satisfactory results, as they are either too complex or not stable enough to perform tracking.

SUMMARY

The present disclosure overcomes one or more deficiencies of the prior art by proposing a method for representing the yaw orientation of a vehicle visible on an image, the yaw orientation of the vehicle being for example configured to be used in a subsequent tracking step (for example a tracking of the yaw orientation of the vehicle), comprising:
  obtaining the position in the image of a rectangular bounding box surrounding the vehicle, obtaining the position of a vertical split line of the bounding box configured to be placed at a corner of the vehicle separating a first portion of the vehicle from a second portion of the vehicle, the first and second portions being either the front, the back, or a side of the vehicle, and at least one of the first and second portion is visible on the image, determining a signed horizontal shift of a horizontal position, associated with the vertical split line (e.g., the middle of the first visible portion of the vehicle, or even a third of the portion measured from any given side), with respect to a horizontal reference position, associated to the bounding box (e.g., the middle of the bounding box), normalizing the signed horizontal shift to obtain a value θ to be used in the representation of the yaw orientation of the vehicle.

By associated with, what is meant is that the horizontal position can be defined using the horizontal position of the vertical split line and, for example, the position of the bounding box (for example the positions of its corners, or the positions of the left and right edges of the bounding box). Also, the horizontal reference position can be defined using the position of the bounding box (for example the positions of its corners, or the positions of the left and right edges of the bounding box).

Also, when the vehicle is visible on the image, two portions can be visible, for example the front and a side, or the back and a side. Only one portion can also be visible, in this case it can be any one from the front, rear, or a side.

The yaw orientation can be used to express a representation of the pose of the vehicle. This representation of the pose is a set of data, which represents the position of the vehicle in space around the camera used to acquire the image. It is common to represent vehicles to be arranged on a planar surface (e.g., road surface), in this case their roll and pitch orientations could be neglected/ignored and the yaw orientation becomes the only orientation needed to describe the pose of the vehicles.

The inventors of the present invention have observed that it is possible to use a single bounding box equipped with a split line indicating the position of a visible corner (front right, front left, back right, or back left corner) of the vehicle so as to perform the tracking of the vehicle.

Instead of using binary values as mentioned above in relation to document "Multi-view 3d object detection network for autonomous driving", the invention proposes using a signed shift between a reference and the position associated with the split line. This allows having more information to stabilize a detection performed on a subsequent frame (i.e., when tracking is performed).

The value θ can be used as an input in a subsequent tracking step. In fact, the value θ facilitates the use of any temporal process, for example any temporal filtering as temporal filtering has been observed to improve the tracking using 2.5DBB.

It should be noted that the normalization step allows obtaining values of θ which can be independent of the size of the vehicle or of the bounding box, for example.

Additionally, the normalization makes the value θ unitless.

According to a particular embodiment, the horizontal reference position associated with the bounding box is the horizontal middle of the bounding box or one lateral side of the bounding box.

It has been observed that this position is a reliable position, which does not change much in critical situations, for example, when a vehicle is seen substantially from the rear or from the front.

According to a particular embodiment, the position associated with the vertical split line is the horizontal middle of either the first or the second portion.

According to a particular embodiment, the value θ to be used in the representation of the pose of the vehicle is calculated as:

$$\theta = \frac{d}{W}$$

wherein d is the signed shift and W is a normalizing factor, for example associated with the bounding box (defined using the position of its corners, or the positions of the left and right edges of the bounding box).

According to a particular embodiment, W is the width of the bounding box.

Both d and W can be measured in the same units, thus θ is unitless.

According to a particular embodiment, the method comprises determining a pose of the vehicle using the representation of the yaw orientation.

According to a particular embodiment, the method further comprises determining a yaw angle of the vehicle using the value θ.

This yaw angle can be used in any vehicle deep learning based detection method to improve its training.

Also, the value θ may be converted to a yaw angle value on the basis of the knowledge of the aspect ratio of the vehicle (width/length), or on the basis of a predefined aspect ratio which is satisfying for multiple vehicles.

According to a particular embodiment, determining a yaw angle comprises using a given aspect ratio associated with the vehicle.

According to a particular embodiment, determining the yaw angle comprises determining a function approximating the yaw angle taking as input the value θ and the aspect ratio associated with the vehicle, this function being:

a piecewise linear function fitted on a set of given points associating a value of yaw angle with a value θ and an aspect ratio, or a function constructed heuristically.

The invention also provides a method for tracking the yaw orientation of a vehicle in a sequence of images comprising determining the value θ obtained by the method as defined above for each image of the sequence of image.

The invention also proposes a device for representing the yaw orientation of a vehicle visible on an image, the yaw orientation of the vehicle being for example configured to be used in a subsequent vehicle step, comprising:

a module for obtaining the position in the image of a rectangular bounding box surrounding the vehicle, a module for obtaining the position of a vertical split line of the bounding box configured to be placed at a corner of the vehicle separating a first portion of the vehicle from a second portion of the vehicle, the first and second portions being either the front, the back, or a side of the vehicle, a module for determining a signed horizontal shift of a horizontal position, associated with the vertical split line (e.g., the middle of the first visible portion of the vehicle), with respect to a horizontal reference position, associated to the bounding box (e.g., the middle of the bounding box), a module for normalizing the horizontal shift to obtain a value θ to be used in the representation of the yaw orientation of the vehicle.

This device may be configured to perform any embodiment of the method as defined above.

The invention also provides a vehicle comprising a device as defined above.

In one particular embodiment, the steps of the method are determined by computer program instructions.

Consequently, the invention is also directed to a computer program for executing the steps of a method as described above when this program is executed by a computer.

This program can use any programming language and take the form of source code, object code or a code intermediate between source code and object code, such as a partially compiled form, or any other desirable form.

The invention is also directed to a computer-readable information medium containing instructions of a computer program as described above.

The information medium can be any entity or device capable of storing the program. For example, the medium can include storage means such as a ROM, for example a CD ROM or a microelectronic circuit ROM, or magnetic storage means, for example a diskette (floppy disk) or a hard disk.

Alternatively, the information medium can be an integrated circuit in which the program is incorporated, the circuit being adapted to execute the method in question or to be used in its execution.

BRIEF DESCRIPTION OF THE DRAWINGS

Further features and advantages of the present disclosure will become apparent from the following description of certain embodiments thereof, given by way of illustration only, not limitation, with reference to the accompanying drawings in which.

DESCRIPTION OF EMBODIMENTS

We will now describe obtaining a representation of the yaw orientation of a vehicle visible on an image, which can for example be used to represent or express the pose of this vehicle. This pose is relative to the camera which has acquired the image and comprises information on either the position in the image and the orientation of the vehicle, or the position in space relative to the camera and the orientation of the vehicle.

Typically, the camera, which has acquired the image, is embedded in another vehicle.

Also, the determination of the yaw orientation allows performing a tracking of the vehicle. This tracking involves determining the evolution over time of this pose.

Figure 1:
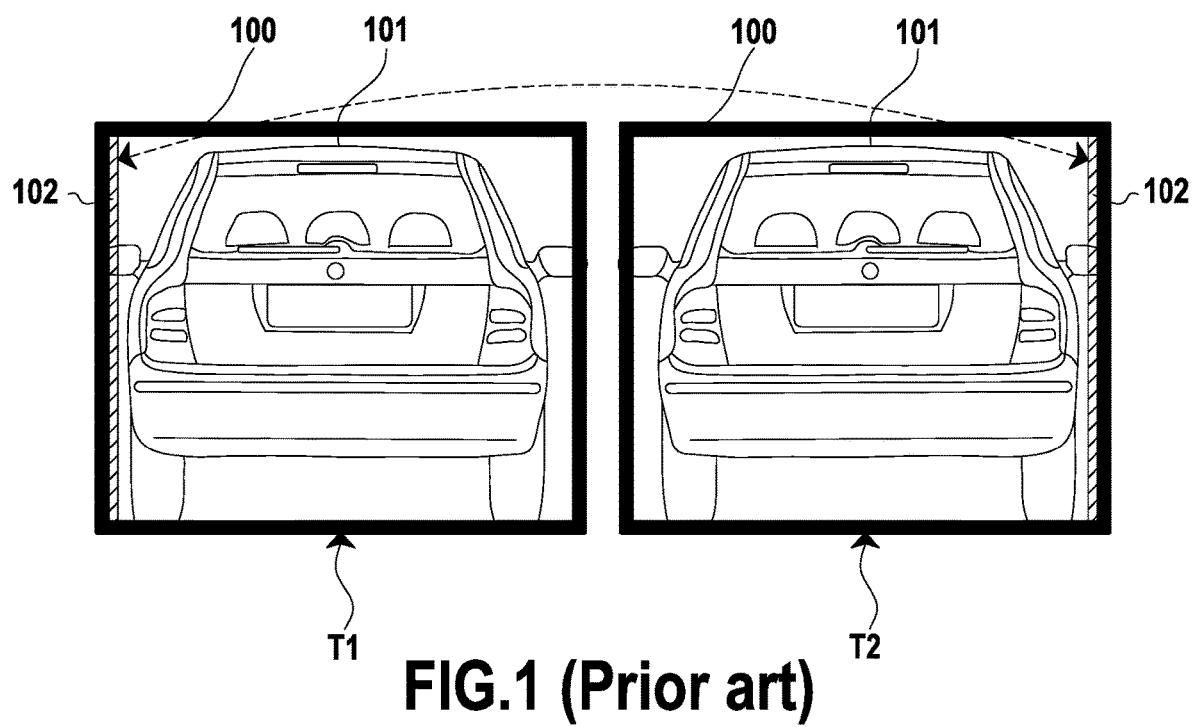
FIG. 1 illustrates the difficulty associated with using a split line in the methods of the prior art.

FIG. 1 illustrates the operation of the methods of the prior art and notably the method of document "Multi-view 3d object detection network for autonomous driving". In this figure, two different detection times are represented: T1 and T2.

At the first detection time T1, a bounding box 100 is determined to be enclosing a vehicle 101 visible on an image acquired by a camera. The determination of the dimensions and position of the bounding box 100 with respect to the vehicle 101 can be determined using a machine learning method such as a deep neural network in a manner known by the person skilled in the art.

Furthermore, using the method of document "Multi-view 3d object detection network for autonomous driving", the position (here the horizontal position) of a split line 102 which separates the visible front/back portion of the vehicle from a visible side is determined.

At the first detection line T1, the split line is determined to be on the left side of the bounding box. However, in view of the position of the vehicle, which is typically the position of a vehicle in front of the vehicle equipped with a camera, determining the position of the split line is difficult.

Using binary values to indicate which side of the split line is the front/back has been observed to lead to jumps of the split lines between the left side and the right side in situations where the vehicle is seen from the back/front. For example, at time T2, the split line 102 moves to the right of the bounding box.

This instability is detrimental when performing a tracking of the pose of the vehicle.

Figure 2:
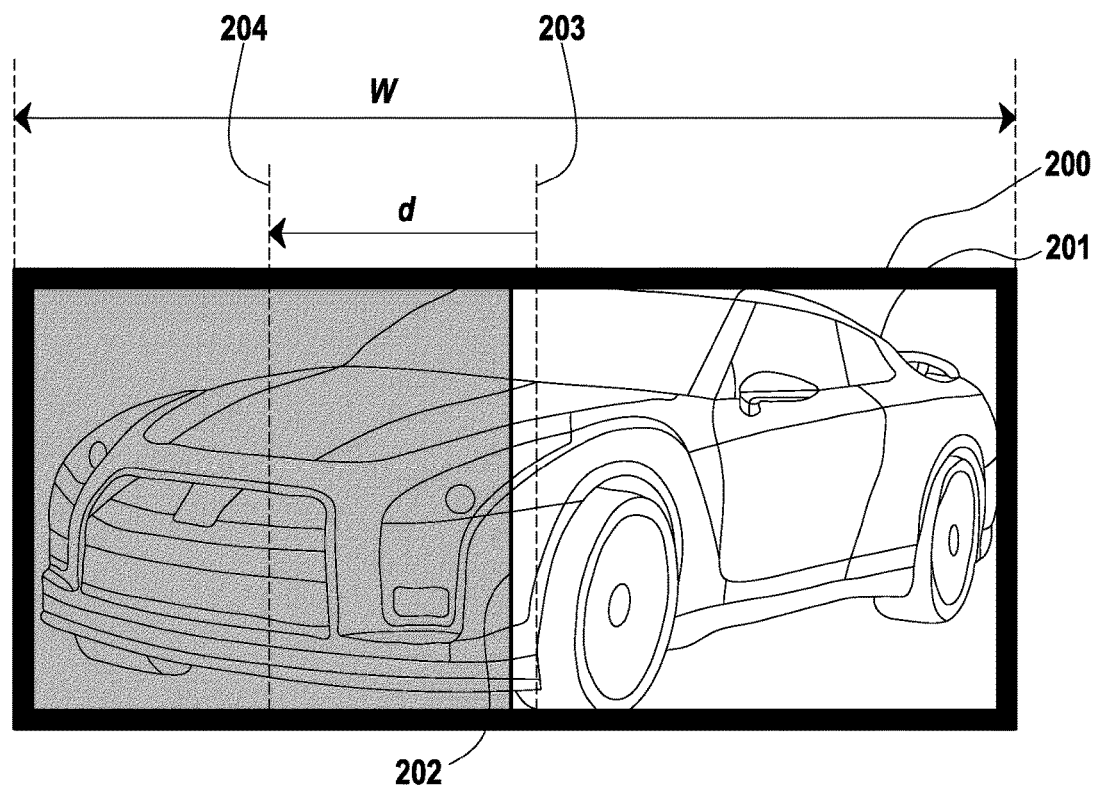
FIG. 2 illustrates the measurement of the shift used in an example.

Instead, the disclosure proposes to introduce a value calculated on the basis of a measured signed shift, as shown on FIG. 2. On this figure a rectangular bounding box 200 has its position found so as to surround a vehicle 201 visible on an image. The position of the bounding box means the dimensions and the location on the image, or the position of each corner on the image.

The position of the vertical split line 202 is obtained and is configured to be at a corner of the vehicle separating a first portion of the vehicle from a second portion of the vehicle, the first and second portion being either the front, the back, or a side of the vehicle. In the illustrated example, the first portion is the front of the vehicle and is grayed while the second portion is the left side of the vehicle.

Preferably, the first portion is the front or the back, and the second portion is the left or right side of the vehicle. In fact, one or two portions are usually visible and if two are visible, it is always a pair chosen in the group comprising front and right side, front and left side, back and right side, and back and left side.

According to an example, the proposed methods also obtain the position of a reference horizontal position in the bounding box: the middle position 203, and the middle 204 of the first portion (here the portion in which the front portion of the vehicle is visible.

The position of the bounding box and of the split line can be obtained using a deep network trained to detect vehicles (as bounding boxes) in images. It is also possible to train a deep neural network to predict the position of the split line.

It should be noted that the above mentioned positions are horizontal positions associated with vertical lines.

This allows determining a signed shift d of the middle position 203 of the bounding box with respect to the middle position of the first portion.

A normalization of this signed shift can then be carried out to obtain a value θ calculated as:

$$\theta = \frac{d}{W}$$

With W the width of the bounding box 200.

This value θ can then be used in the representation of the yaw orientation of the vehicle, in a subsequent tracking step, and also in a time filtering step.

It has been observed that using this value θ prevents the split line from jumping from one side to the other when the vehicle is seen from the front or from the back.

Figure 3:
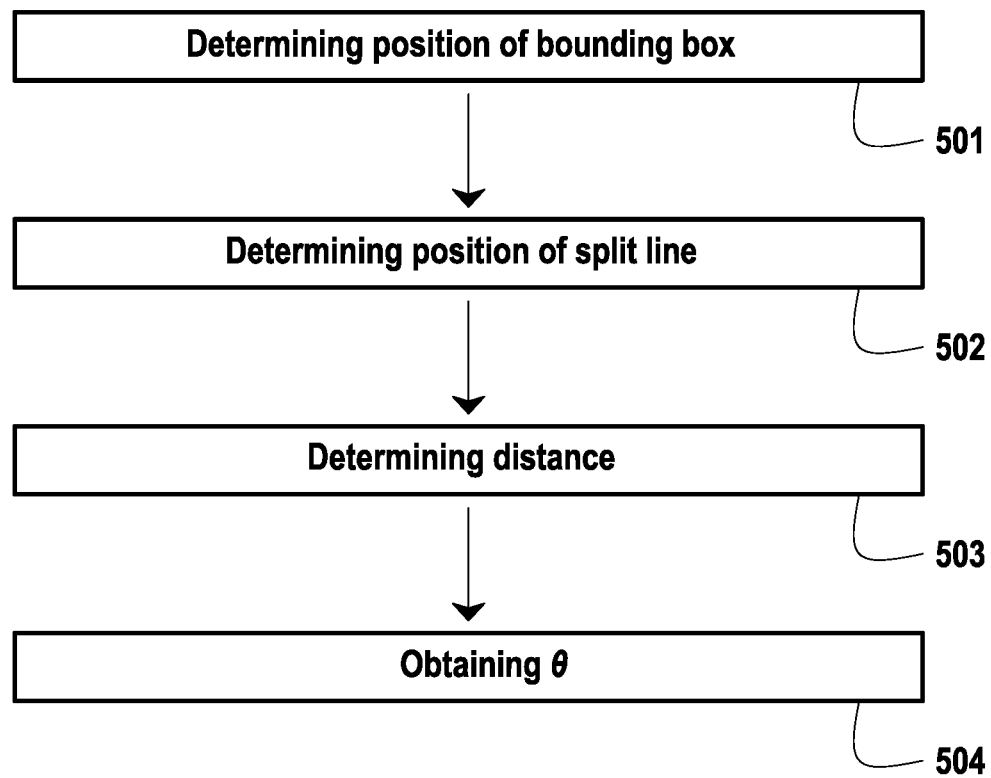
FIG. 3 is a schematic representation of the steps of a method according to an example.

The steps of a method for representing the yaw orientation of a vehicle visible on an image are represented schematically on FIG. 3.

These steps may be performed by a device such as the device which will be described hereinafter in reference to FIG. 4. Typically, a device equipped with a processor can implement the method.

These steps are performed on an image which has been acquired by a camera, for example embedded on another vehicle. This image shows a vehicle such as the vehicle of FIG. 2.

In a first step S01, the position of a bounding box such as bounding box 200 is obtained. This step may be carried out using machine learning techniques such as neural networks.

In a second step S02, obtaining the position of the split line 202 is carried out. This step can also be carried out using machine learning techniques.

Then, the signed shift d is determined in step S03. This step is a calculation step.

The value θ can then be calculated in step S04 using the above mentioned formula:

$$\theta = \frac{d}{W}$$

It should be noted that the method may further include a temporal filtering of θ, and a subsequent tracking step of the yaw orientation or of the pose of the vehicle (which will use θ, the position of the bounding box, and the position of the split line). Additionally, the linear yaw can be determined (or the angular yaw if the aspect ratio of the vehicle is known).

For example, the value θ, can be used to estimate the vehicle's actual yaw ϕ angle (measured in, for example, in radians). To estimate ϕ accurately one needs the vehicle aspect ratio $\alpha = w_v/l_v$, where $w_v$ is the vehicle actual width and $l_v$ is the vehicle actual length (both measured in meters, not pixels). The proposed method is not sensitive to exact values of the aspect ratio α, thus it can be provided approximately. For example, α can be "guessed" from the vehicle type (i.e., long/short passenger car, truck, bus etc.) using the same vehicle detector, which provides the bounding box and the split line. Two alternatives are proposed to estimate/approximate the yaw angle function ϕ(θ, α). The first alternative is based on linearization. The desired function ψ(θ, α) is approximated by a piecewise linear surface ϕ=ϕ$_1$(θ, α), which has been fitted into a set of three-dimensional points $\mathcal{P} \stackrel{\text{def}}{=} \{(\theta_i, \alpha_i, \psi_i) | i=1, \ldots, N\} \subset \mathbb{R}^3$ (for example N=32768), computed using synthetically randomly generated vehicle bounding boxes given a fixed camera configuration (camera resolution, and field of view). In these randomly generated data all the parameters of interest (vehicle yaw angle ϕ, vehicle aspect ratio α, and θ) for each bounding box are known by design.

The second alternative is based on analytical approximation. The desired function ϕ(θ, α) is approximated by an analytical function ϕc$_1$,c$_2$(θ,α):

$$\phi(\theta,\alpha) \approx \phi_{c_1,c_2}(\theta,\alpha) \stackrel{\text{def}}{=} \text{sign}(\theta)(2|\theta|)^{p(c_1 \times 2)} \pi/2,$$

where $p(c_1,c_2) = \max(1, c_1/\min(1, \alpha))^{c_2}$. The function ϕc$_1$,c$_2$(θ, α) can be constructed heuristically, and its parameters (for example $c_1=0.849592$ and $c_2=0.924694$) can be estimated numerically by minimizing the fitting error defined as $E(c_1,c_2) = \Sigma_{i=1}^{N} |\phi_i - \phi_{c_1,cd2}(\theta_i, \alpha_i)|$.

It should be noted that the parameters $c_1$ and $c_2$ may change for different cameras.

Figure 4:
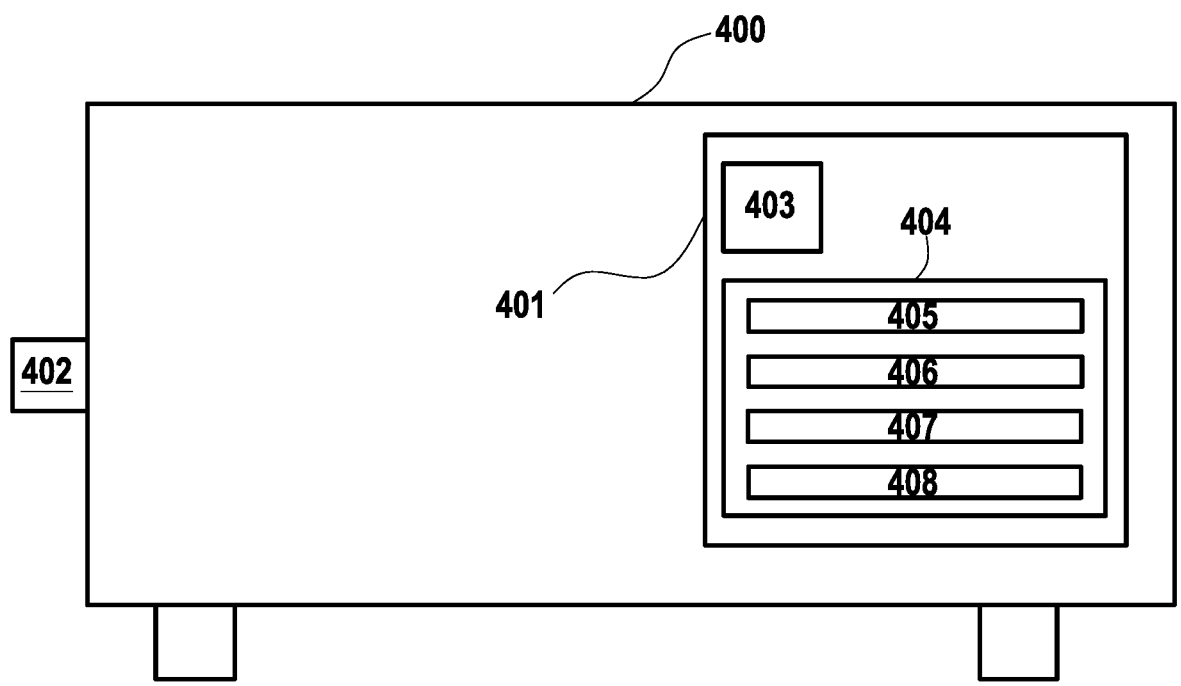
FIG. 4 is a vehicle according to an example.

FIG. 4 shows a vehicle 400 equipped with a device 401 configured to implement a method such as the method disclosed in reference to FIG. 3.

This vehicle further comprises a camera 402 configured to acquire images of the road on which the vehicle is travelling and which will typically acquire images of other vehicles present on the road such as the vehicle 201 seen on FIG. 2.

The device 401 comprises a processor 403 and a non-volatile memory 404 comprising computer instructions to implement the above mentioned method on an image acquired by camera 402.

More precisely, the computer instructions include:
- An instruction 405 which, when executed by the processor 403, performs step S01,
- An instruction 406 which, when executed by the processor 403, performs step S02,
- An instruction 407 which, when executed by the processor 403, performs step S03,
- An instruction 408 which, when executed by the processor 403, performs step S04.

The instructions 405 to 408 form, in combination with the processor 403, modules of the device 401.

Although the present invention has been described above with reference to certain specific embodiments, it will be understood that the invention is not limited by the particularities of the specific embodiments. Numerous variations, modifications and developments may be made in the above-described embodiments within the scope of the appended claims.

The invention claimed is:

1. A method for representing the yaw orientation of a vehicle visible on an image comprising:
    obtaining the position in the image of a rectangular bounding box surrounding the vehicle,
    obtaining the position of a vertical split line of the bounding box configured to be placed at a corner of the vehicle separating a first portion of the vehicle from a second portion of the vehicle, the first and second portions being either the front, the back, or a side of the vehicle, and at least one of the first and second portion is visible on the image, wherein the position associated with the vertical split line is the horizontal middle of either the first or the second portion,
    determining a signed horizontal shift of a horizontal position, associated with the vertical split line, with respect to a horizontal reference position, associated to the bounding box, wherein the horizontal reference position is the horizontal middle of the bounding box or one lateral side of the bounding box; and
    normalizing the signed horizontal shift to obtain a value θ to be used in the representation of the yaw orientation of the vehicle.

2. The method of claim 1, wherein the value θ to be used in the representation of the pose of the vehicle is calculated as:

θ=d/W wherein d is the signed shift and W is a normalizing factor associated with the bounding box.

3. The method of claim 2, wherein W is the width of the bounding box.

4. The method according to claim 1, comprising determining a pose of the vehicle using the representation of the yaw orientation.

5. The method of claim 1, further comprising determining a yaw angle of the vehicle using the value $\theta$.

6. The method of claim 5, wherein determining a yaw angle comprises using a given aspect ratio associated with the vehicle.

7. The method of claim 6, wherein determining the yaw angle comprises determining a function approximating the yaw angle taking as input the value $\theta$ and the aspect ratio associated with the vehicle, the function being:
- a plane fitted on a set of given points associating a value of yaw angle with a value $\theta$ and an aspect ratio, or constructed heuristically.

8. A method for tracking the yaw orientation of a vehicle in a sequence of images comprising determining the value $\theta$ obtained by the method according to claim 1 for each image of the sequence of image.

9. A device for representing the yaw orientation of a vehicle visible on an image comprising:
- a module for obtaining the position in the image of a rectangular bounding box surrounding the vehicle,
- a module for obtaining the position of a vertical split line of the bounding box configured to be placed at a corner of the vehicle separating a first portion of the vehicle from a second portion of the vehicle, the first and second portion being either the front, the back, or a side of the vehicle, wherein the position associated with the vertical split line is the horizontal middle of either the first or the second portion,
- a module for determining a signed horizontal shift of a horizontal position, associated with the vertical split line, with respect to a horizontal reference position, associated to the bounding box, wherein the horizontal reference position is the horizontal middle of the bounding box or one lateral side of the bounding box; and
- a module for normalizing the signed horizontal shift to obtain a value $\theta$ to be used in the representation of the yaw orientation of the vehicle.

10. A vehicle comprising a device for representing the yaw orientation of a vehicle visible on an image the vehicle comprising at least one processor configured for:
- obtaining the position in the image of a rectangular bounding box surrounding the vehicle,
- obtaining the position of a vertical split line of the bounding box configured to be placed at a corner of the vehicle separating a first portion of the vehicle from a second portion of the vehicle, the first and second portion being either the front, the back, or a side of the vehicle, wherein the position associated with the vertical split line is the horizontal middle of either the first or the second portion,
- determining a signed horizontal shift of a horizontal position, associated with the vertical split line, with respect to a horizontal reference position, associated to the bounding box, wherein the horizontal reference position is the horizontal middle of the bounding box or one lateral side of the bounding box; and
- normalizing the signed horizontal shift to obtain a value $\theta$ to be used in the representation of the yaw orientation of the vehicle.

11. A non-transitory computer-readable medium having recorded thereon a computer program including instructions that when executed by a processor cause the processor represent the yaw orientation of a vehicle visible on an image comprising:
- obtaining the position in the image of a rectangular bounding box surrounding the vehicle,
- obtaining the position of a vertical split line of the bounding box configured to be placed at a corner of the vehicle separating a first portion of the vehicle from a second portion of the vehicle, the first and second portions being either the front, the back, or a side of the vehicle, and at least one of the first and second portion is visible on the image, wherein the position associated with the vertical split line is the horizontal middle of either the first or the second portion,
- determining a signed horizontal shift of a horizontal position, associated with the vertical split line, with respect to a horizontal reference position, associated to the bounding box, wherein the horizontal reference position is the horizontal middle of the bounding box or one lateral side of the bounding box; and
- normalizing the signed horizontal shift to obtain a value $\theta$ to be used in the representation of the yaw orientation of the vehicle.

* * * * *